INVENTORS
RICHARD L. CROSSMAN
PETER D. BERMINGHAM

BY *Milliken*

ATTORNEY

United States Patent Office 3,491,786
Patented Jan. 27, 1970

3,491,786
TIRE INFLATION AND PRESSURE CONTROL VALVE
Richard L. Crossman, Tallmadge, and Peter D. Bermingham, Suffield, Ohio, assignors to The Goodyear Tire & Rubber Company, Akron, Ohio, a corporation of Ohio
Filed Feb. 26, 1968, Ser. No. 708,005
Int. Cl. F16k *15/20, 17/04;* G05d *7/01*
U.S. Cl. 137—102                                    9 Claims

ABSTRACT OF THE DISCLOSURE

A tire safety inflation and deflation valve which uses a conventional tire valve core in combination in the same valve housing with a spring biased sliding sleeve type pressure relief valve system which opens when the tire reaches a certain predetermined internal pressure either during inflation or at any other time and exhausts the excess pressure from the tire while simultaneously reducing the pressure and flow of any inflation air which may be flowing into the tire through the valve stem and diverting this excess inflation air flow through an exhaust port in the valve body to the outside atmosphere.

---

This invention relates to a tire safety inflation and deflation valve which contains the combination of a conventional tire valve core and a spring biased sliding sleeve type pressure relief valve system which opens when subjected to a certain predetermined internal pressure to release excess pressure and flow to the atmosphere and simultaneously reduce the pressure and flow of any air that may be flowing through the valve during inflation of the tire.

DESCRIPTION OF THE PRIOR ART

In the past, many types of spring biased pressure relief valves have been devised for use in tire valves. Many of these prior art devices have either been inefficient from the operational standpoint, or they have contained too many complicated moving parts. In addition, many of the prior art devices required an especially designed valve core and valve stem and could not be readily adapted to the conventional valve parts readily obtainable on the market.

The most pertinent prior art known to applicant are Patent No. 2,510,192, issued to E. Payne, Patent No. 2,606,570, issued to W. G. Buenik, Patent No. 2,672,153, issued to L. J. Kipp, and Patent No. 2,690,757, issued to R. Orchowski. The problem of pressure relief valves has also been dealt with in patents showing valves for tires provided with inner and outer chambers wherein the valve is used for simultaneous inflation of both chambers in such a manner as to create a higher pressure in the inner chamber than in the outer chamber. Such valves frequently contain a means for releasing excess pressure from the inner chamber to the outer chamber of the tire. A typical example of such patents is shown by Patent No. 3,361,153, issued to H. W. Krohn et al. which shows a valve made for use with a double chambered tire of the type produced by The Goodyear Tire & Rubber Company.

OBJECTS OF THE INVENTION

It is the primary object of this invention to provide a combination tire inflation valve and pressure control safety valve which is simple to produce and has a minimum number of moving parts.

Another object of this invention is to provide a tire inflation and excess pressure relief valve which releases excess tire pressure quickly and safely without valve chatter or vibration.

Still another object of this invention is to provide a tire inflation and pressure relief valve which may be inserted in a conventional valve stem and which uses a conventional tire valve core.

These and other objects of the invention will become more fully apparent as the description proceeds in the following specification and the attached drawings.

DESCRIPTION OF THE PREFERRED EMBODIMENTS

Figure 1:
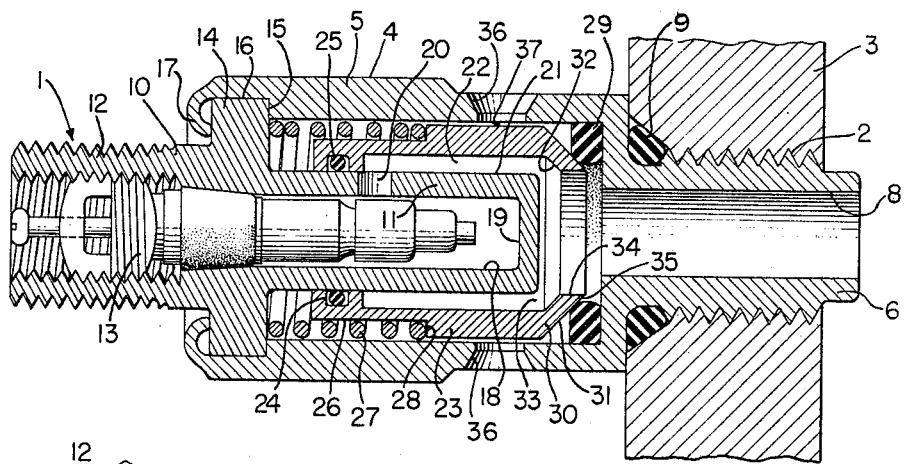
FIGURE 1 is a cross-sectional view of a tire valve threaded into a wheel rim with the relief valve in a closed position.
Figure 2:
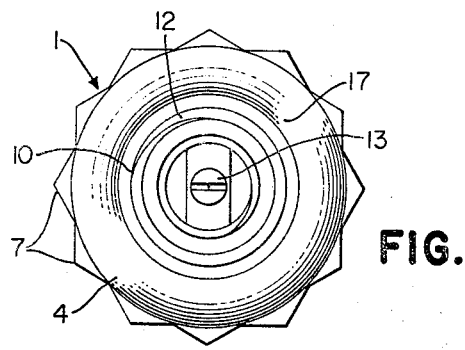
FIGURE 2 is an end view of the valve shown in FIGURE 1 looking at the outer end of the valve.

Referring now to FIGURE 1 of the drawings, the numeral 1 indicates generally the assembled valve of the invention which is screwed into a threaded hole 2 in a wheel rim 3 upon which a tire (not shown) is mounted. The main body or valve housing 4 is of a substantially cylindrical shape and has an axially outer end portion 5 and an axially inner end portion 6 which is threaded externally for engagement with the threaded hose 2. The outer portion 5 is of greater diameter than the inner portion 6 and has on its outer surface a plurality of points 7 as shown in FIGURE 2 to fit a socket wrench. This outer surface may also be knurled or ribbed to aid in gripping the housing for insertion or removal of the valve 1. The valve housing 4 has a longitudinal bore 8 throughout its length which is greater in diameter in the outer portion 5 than in the inner portion 6. An O ring 9 surrounds the threaded inner portion 6 and provides an airtight seal between the wheel rim 3 and the housing 4 when the valve 1 is screwed into the wheel. A hollow tubular valve stem 10 is mounted within the housing 4 with the axially inner end 11 of the valve stem extending into the outer end portion 5 of the housing 4 and an axially outer end portion 12 of the valve stem 10 projecting from the outer end of the housing. The outer portion 12 of the valve stem 10 is threaded internally to receive a conventional valve core 13 and is threaded externally to receive a conventional valve cap or inflation-deflation tool (not shown). The valve stem 10 is an integral annular flange 14 extending radially outwardly and circumferentially around the valve stem 10 between the inner portion 11 and the outer portion 12. The flange 14 seats against a ledge 15 formed by an offset internal groove 16 in the outer end of the housing 4. The ledge 15 determines the depth which the valve stem 10 will extend into the interior of the housing 4. At the outer end of the housing 4, the housing wall is reduced in thickness to permit the wall segment 17 to be crimped over the flange 14 to retain the valve stem 10 within the housing 4. The valve stem 10 has an axial center bore 18 running throughout its length except for an end wall 19 at the inner end of the valve stem 10, the purpose of which will be explained in detail later in the specification. The valve core 13 screws into the valve stem 10 and seals against a portion of the center bore 18 in the usual manner. The inner end portion 11 of the valve stem 10 has a port 20 in the sidewall 21 thereof to permit the flow of air from the center bore 18 of the valve stem 10 into an annular passage 22 formed between the valve stem 10 and a cylindrical sleeve type safety valve 23 which is telescopically mounted in sliding relationship to the inner end portion 11 of the valve stem 10. The outer end of the relief valve 23 has a groove 24 which carries a resilient seal ring 25. This seal ring engages the outer surface of the valve stem 10 outwardly from the port 20 to contain the air entering the passage 22 and direct the air flow from the port 20 axially inwardly along the passage 22. The relief valve 23 has a stepped portion 26 on the axially outer end thereof which creates sufficient space between the valve housing 4 and the valve stem 10 to receive a coil spring 27, one end of which seats against the flange 14 and the other end seats against a ledge 28 on the safety valve. When assembled in the valve 1, the spring 27 is under compression to urge the valve 23 axially inwardly against a resilient seal ring 29 located in the inner corner of the outer portion 5 of the housing 4. The relief valve 23 has a conical end portion 30 on its axially inner end. The outer surface 31 of the conical end 30 seals against the seal ring 29 when the valve 23 is in the closed position as shown in FIGURE 1. The inner surface 32 of the conical end 30 forms in conjunction with the closed inner end wall 19 of the valve stem 10 an annular orifice 33 which controls the pressure of air flowing from the valve stem 10 through the port 20 and through the passage 22, past the orifice and through a center opening 34 in the end of the valve 23 and into the center bore 8 of valve housing 4 which leads into the tire chamber.

When the valve 23 is closed and the conical end portion 30 is seated on the seal ring 29, an exposed portion 35 of the surface 31 extends radially inwardly from where the surface 31 contacts the seal ring 29. The housing 4 has four exhaust points 36 which are in communication with an annular passage 37 between the housing 4 and the relief valve 23 to permit air to flow from the passage 37 to the outside atmosphere. It will be obvious that the number of ports 36, which are used and the size thereof, may be varied depending upon the requirements of each particular valve and the tire pressure involved.

Figure 3:
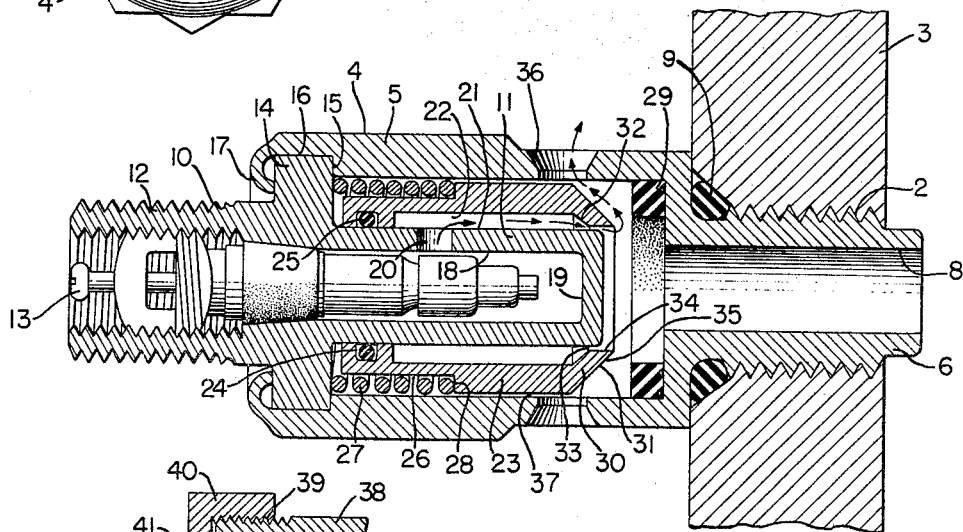
FIGURE 3 shows the same valve as FIGURE 1 but with the pressure relief valve in an open position.

In operation, an air source is applied to the outer end 12 of the valve stem 10. This opens the valve core 13 and permits air to flow through the center bore 18 of the valve stem 10, through the port 20, through the passage 22 and then through the center bore 8 of the housing 4 and into the tire. Once the internal pressure of the tire reaches some predetermined amount, the internal pressure acting against the exposed portion 35 of the surface 31 overcomes the pressure of the spring 27 and the incoming air and forces the relief valve 23 axially outwardly to simultaneously break the seal between the surface 31 and the seal ring 29 and to reduce the size of the orifice 33 formed between the surface 32 and the inner end of the valve stem 10 as shown in FIGURE 3. Once the valve 23 begins to open, the internal pressure is exerted upon the entire surface 31 rather than merely the previously exposed inner portion 32 and hence moves the valve 23 more rapidly and with a more positive action than the pressure acting on the smaller surface 32, thus preventing seepage when operating close to reseating pressure. The incoming air flowing past the annular orifice 33 tends to balance the internal pressure and exhaust flow against the surface 31 and the valve 23 tends to seek an equilibrium between the internal pressure and exhaust flow and the pressure and flow of the incoming air. This equilibrium prevents valve chatter or vibration. The design of the conical end portion 30, in conjunction with the seal ring 29 and the inner end of the valve stem, is such that the valve 23 will remain open until the internal pressure drops to a substantial margin below the pressure at which the valve will open. This means that the valve 23 will not build up to maximum pressure immediately upon closing and thereby reopen and continue to rapidly repeat the opening and closing cycle and cause vibration and chatter of the valve which will tend to wear out the working parts of the valve. It will be understood that the valve 23 will not only serve as a safety valve during inflation of the tire, but will also open whenever the internal pressure of the tire exceeds a certain predetermined limit due to changes in temperature and other physical changes or operating conditions of the tire. This release of excess pressure will prevent tire blowout or damage to the tire which may be caused by excess internal pressure.

Figure 4:
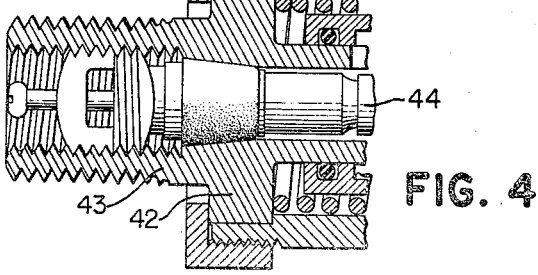
FIGURE 4 shows a fragmentary cross-sectional view of another embodiment of the invention similar to FIGURE 1 except that the valve stem is secured in the valve housing by a threaded nut.

Referring now to FIGURE 4 which shows another embodiment of the invention, it may be assumed that the remainder of the valve which is not shown in FIGURE 4 is identical to parts shown in FIGURE 1. In FIGURE 4, the valve housing 38 is similar to the valve housing 4 in FIGURE 1 except that it has an externally threaded portion 39 which receives a nut 40 having a radially inwardly turned flange 41 which engages the radially outwardly extending flange 42 on the valve stem 43 and retains it in position within the housing 38. A conventional valve core 44 is located in the stem 43 in the same manner as the core 13 is located in the stem 10 in FIGURE 1. The embodiment shown in FIGURE 4 may be used when it is desired to remove the valve stem from the housing. The embodiment shown in FIGURE 1 is used when it is desired to provide a tamper-proof valve in which the valve stem cannot be removed from the housing. The advantage of a tamper-proof valve is rather obvious since the spring tension of the spring 27 is a critical factor in determining at what internal pressure the relief valve will open. If the spring 27 is removed and replaced with a spring of a different length or one with different physical properties, the valve will not perform properly.

Although for the purpose of ilustrating the invention, the valve is shown as being screwed into a threaded hole 2 in a well rim 3, it will be obvious that the axially inner end of the valve may be attached either to a wheel or a tire by any well-known manner which is well-known in the art.

Figure 5:
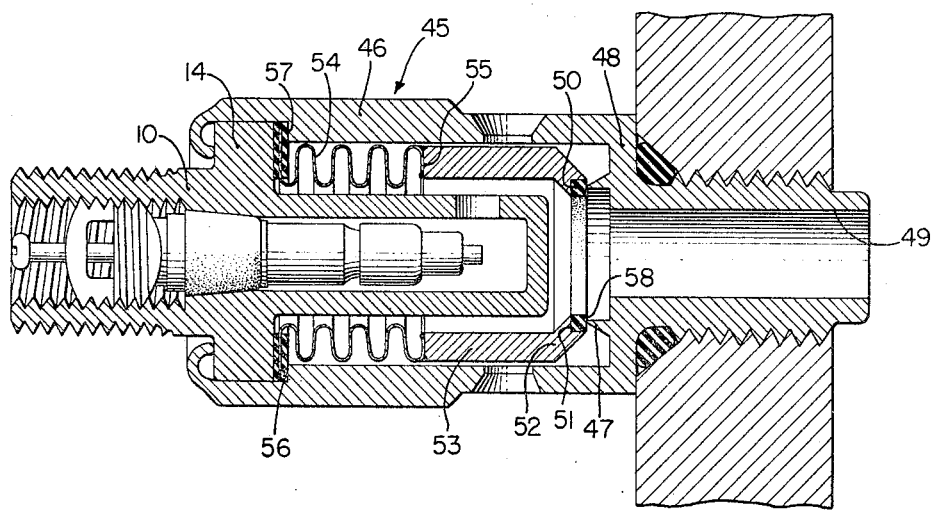
FIGURE 5 shows another embodiment of the invention using a different seal means.

FIGURE 4 shows a modification of the valve shown in FIGURES 1 through 3 but having a different type of biasing means for the relief valve and a different means of sealing both ends of the relief valve with respect to the valve stem and the housing. For simplicity, the parts shown in the embodiment of FIGURE 5 which are identical to those shown in FIGURES 1 through 3, will bear identical numerals. The operation of both embodiments is essentially the same and will not be repeated in detail. The valve 45 shown in FIGURE 5 has a housing 46 which is similar to the valve housing 4 in FIGURES 1 through 3 except that instead of having a seal ring 29 for sealing engagement with the conical end 30 of the relief valve 23, the housing 46 has an integral knife edge shaped lip 47 extending axially outwardly from a stepped portion 48 of the housing 46 and surrounding a center bore 49 which communicates with the internal chamber of a tire. The lip 47 sealingly contacts a sealing ring 50 mounted in a rectangular annular groove 51 in a conical end portion 52 on the axially inner end of a sleeve type relief valve 53. It may be seen that the relief valve 53 in FIGURE 5 is similar to the relief valve 23 in FIGURES 1 through 3 but has been modified to accommodate the sealing ring 50. In other words, the sealing ring in the embodiment of FIGURE 5 is carried by the relief valve 53 rather than by the housing as it is in FIGURES 1 through 3. The relief valve 53 is further modified from that of the valve 23 in that it is shortened at its axially outer end to accommodate a stainless steel bellows 54 which replaces the coil spring 27 used in the embodiment of FIGURES 1 through 3. One end of the bellows 54 is brazed or soldered to the axially outer end 55 of the valve 53. The opposite end of the bellows has a ring shaped rubber gasket 56 molded thereon in such manner that when the relief valve, with the bellows attached thereto, is placed in the housing 46, the outer circumferential edge of the gasket 56 is gripped between a ledge 57 on the housing 46 and a flange 14 on the valve stem 10. When the end portion 58 of the housing 46 is crimped over the flange 14, the gasket 56 is gripped between the flange 14 and the ledge 57 with sufficient force to create an airtight seal around its entire circumference. It may be seen from this description that the bellows 54 not only replaces the spring 27 in FIGURES 1 through 3, but also replaces the seal ring 25. The radially inner portion of the sealing ring 50 extends radially inwardly from the lip 57 and presents a surface 58 against which internal pressure may react in the same manner as described with respect to the exposed portion 35 in FIGURES 1 through 3. When the relief valve 53 opens, the conical end portion 52 operates in the same manner as the conical end portion 30 in the valve 1 and reduces the flow of incoming air into the valve. The relief valve 53 seeks an equilibrium between the pressure of the incoming air and that being exhausted in the same manner as the relief valve 23 in the valve 1.

It will be obvious that the bellows 54 might be used interchangeably with the spring 27, and the sealing ring 50 might be interchanged with the use of sealing ring 29. It is not necessary to use one particular type of spring configuration with one particular type of sealing ring.

This valve is shown and described in this application as being used in conjunction with a tire, however, it may also be used for inflation, deflation and pressure control on any container which holds any type of fluid under pressure.

Various changes can be made in the illustrative embodiments shown herein without departing from the scope of the invention.

What is claimed is:
1. A tire inflation and pressure control valve comprising:
    (A) a hollow valve housing having at least one exhaust port in the wall thereof to permit the passage of air from the inside of the housing to the outside and a relief valve sealing means located within the housing between the exhaust port and the inner end of the housing;
    (B) a tubular stem having an axial bore therein mounted in the housing with at least a portion of the outer surface of its wall adjacent the inner surface of the wall of the housing and spaced therefrom to form an annular passage therebetween and having at least one opening in the wall of the stem for communication between the axial bore and the annular passage;
    (C) a cylindrical relief valve telescopically mounted on the stem in slidable sealing engagement therewith and located in the annular passage between the stem and the housing for limited sliding longitudinal movement, said relief valve having at its inner end, means creating an annular orifice between the relief valve and the tubular stem, the size of said orifice being varied by longitudinal movement of the relief valve with respect to the stem;
    (D) a bias means for urging said relief valve in a normally closed position thereby causing the relief valve sealing means to block the flow of air through the exhaust port until a certain predetermined internal pressure is reached at which time, the internal pressure will overcome the spring pressure and force the relief valve open to port the excess air and simultaneously reduce the flow of incoming air by reduction in the size of the annular orifice between the relief valve and the tubular stem, thereby limiting the internal pressure to the desired level;
    (E) a normally closed valve in the longitudinal passage of the valve stem which opens and closes independently of said relief valve; and
    (F) means for mounting the valve housing in communication with a tire chamber to be inflated.
2. A tire inflation pressure control valve as claimed in claim 1 wherein the inner end of the relief valve seats against a resilient seal ring on the valve housing to prevent escape of air from the tire when the relief valve is closed.
3. A tire inflation and pressure control valve as claimed in claim 1 wherein the inner end of the relief valve carries a resilient seal ring which seats against a circular metal lip on the housing.
4. A tire inflation and pressure control valve as claimed in claim 1 wherein the bias means is a coil spring.
5. A tire inflation and pressure control valve as claimed in claim 1 wherein the bias means is a bellows.
6. A tire inflation and pressure control valve as claimed in claim 1 wherein the valve stem is permanently secured in the valve housing by crimping the outer end of the housing over a flange portion on the valve stem.
7. A tire inflation and pressure control valve as claimed in claim 1 wherein the valve stem is removably held in the valve housing by a nut which screws onto an externally threaded portion on the outer end of the valve housing, said nut having a radially inwardly turned flange which engages a radially outwardly extending flange on the valve stem.
8. A tire inflation and pressure control valve as claimed in claim 1 wherein the inner end of the valve housing is screwed into a threaded hole in a wheel rim and tightened against an O-ring which creates an airtight seal between the valve and the wheel rim.
9. A pressure control valve for use on a pressurized container comprising:
    (A) a hollow valve housing having
        (1) an exhaust port in the sidewall thereof, and
        (2) a seal means between the port and the inner end of the housing;
    (B) a hollow valve stem located centrally within the housing and spaced therefrom to form an annular passage therebetween, said stem having
        (1) a cylindrical sidewall having at least one opening therein, and
        (2) a closed end wall on the inner end thereof;
    (C) a cylindrical relief type valve telescopically mounted on the stem in slidable sealing engagement therewith in the annular passage between the housing and the stem, said relief valve having
        (1) a cylindrical sidewall
        (2) an integral flange extending radially inwardly therefrom, one surface of said flange seating on the housing seal means and another surface thereof creating an annular orifice in conjunction with the inner end of the valve stem, said orifice being simultaneously reduced in size to restrict the flow of any incoming fluid when the relief valve is unseated from the housing seal due to excessive internal pressure;
    (D) bias means holding said relief valve in a normally closed position to block the flow of fluid through the exhaust port until a certain predetermined pressure is reached within the container; and
    (E) a normally closed valve centrally located in the valve stem which opens and closes independently of the relief valve.

References Cited

UNITED STATES PATENTS

| | | | |
|---|---|---|---|
| 1,137,209 | 4/1915 | Henemier | 137—226 |
| 1,724,063 | 8/1929 | Anderson | 137—225 |
| 2,323,237 | 6/1943 | Payne | 137—226 |
| 3,421,535 | 1/1969 | Hawkes | 152—341 XR |

HAROLD W. WEAKLEY, Primary Examiner

U.S. Cl. X.R.

137—226, 543.15